Jan. 20, 1959

J. H. BENT

2,869,403

POWER OPERATED TOOL WITH FLUID PRESSURE ACTUATED POSITIVE FEED

Filed Dec. 6, 1956

INVENTOR
JOHN H. BENT
by: Carlson, Pitzner, Hubbard & Wolfe
ATTYS.

United States Patent Office 2,869,403
Patented Jan. 20, 1959

2,869,403

POWER OPERATED TOOL WITH FLUID PRESSURE ACTUATED POSITIVE FEED

John H. Bent, North Hollywood, Calif., assignor to Gardner-Denver Company, Quincy, Ill., a corporation of Delaware Application December 6, 1956, Serial No. 626,776

9 Claims. (Cl. 77—34.4)

The present invention relates generally to tools of the type intended for performing drilling and allied operations and more particularly to such tools which are effective not only to drive a rotary cutting element but also to impart feed and return movements thereto with respect to a workpiece.

In performing drilling or similar operations on materials of the so-called work-hardening type the materials tend to increase in hardness ahead of the drill or other cutting element being used. In order to successfully perform such operations on these materials not only must the cutting element be rotated but also it must be positively advanced with respect to the work so that removal of the material of the work is insured.

Pressure fluid operated tools possess numerous features that make their employment especially advantageous in an almost infinite number of applications among which features are included their comparatively small size, light weight, durability, ease of control, and safety. Each of these features has contributed to the wide use of portable tools of this type in the so-called temporary tooling practice which has been widely adopted by industry where frequent design changes make uneconomical the utilization of permanent, special-purpose machine tools.

Many portable pressure fluid operated tools incorporate piston and cylinder arrangements for effecting longitudinal, or feed and return, spindle movement. In the use of such tools for performing drilling and allied operations on work-hardening materials it has been found difficult to achieve adequate forward thrust to insure feed or advance of the cutting element into the work, and thereby to insure chip removal, with the result that the cutting operation ceases.

Accordingly, it is a general object of the present invention to provide in a portable pressure fluid operated tool simple and reliable means for positively effecting longitudinal or feed and return movement of the tool's spindle, as well for rotating the same, substantially independently of the resistance to such movement offered by the work and at a predetermined rate and thrust.

A more specific object is to provide a self-contained pressure fluid operated tool having an improved power transmitting mechanism which is effective not only to rotate its spindle and a cutting element mounted thereon but which also is effective to feed and return the spindle positively.

A related object is to provide in a tool of the foregoing character a power transmitting mechanism embodying mechanical means for effecting longitudinal spindle movement which means is rendered operative to impart such movement to the tool's spindle as a result of pressure fluid actuation.

The objects of the invention thus generally set forth together with other objects and ancillary advantages are attained by the construction and arrangement shown by way of illustration in the accompanying drawings, in which.

While the invention is susceptible of various modifications and alternative constructions, there is shown in the drawings and will herein be described in considerable detail the preferred embodiment. It is to be understood, however, that it is not thereby intended to limit the invention to the specific form disclosed. On the contrary it is intended to cover all modifications and alternative constructions falling within the spirit and scope of the invention as expressed in the appended claims.

Referring more particularly to the drawings, the form of the invention there shown for purposes of illustration, is embodied in a tool of the type intended for performing drilling and similar operations. The illustrative tool is of the portable type and includes a housing, enclosing the entire operative mechanism of the tool, which housing 20 consists of three portions: a forward or nose piece 20A removably mounted on the forward end of a central, generally cylindrical portion 20B and a rear portion 20C to which the central portion is fixed. The rear housing portion 20C is equipped with a pistol grip handle for facilitating manipulation of the tool. At its forward end the nose portion 20A of the housing is adapted to accommodate a drill bushing tip T by means of which the tool can be readily mounted upon a jig or fixture. The nose piece is provided with access openings 21 to facilitate mounting and demounting of a cutting element such as a drill D and to permit chip clearance.

The illustrative tool is adapted for operation by means of pressure fluid. Thus, the rear end of the main housing portion 20C is formed to provide a motor chamber 22 within which there is disposed a pressure fluid operated motor M. The motor is preferably of the rotary, extensible vane type and is adapted for actuation by compressed air. To retain the motor in place in the motor chamber 22, a suitable rear end closure in the form of a bushing 24 and cap 25 are received in the outer rear end of the motor chamber of the main housing portion 20C. Pressure fluid, in this instance, compressed air, to operate the tool is supplied by way of the handle under the control of a valve generally indicated at 26 from a suitable hose 27 and fitting 28 received in the outer end of a supply passage 29 in the handle. From the valve pressure fluid to actuate the motor is supplied by way of a passage 30 extending from the valve and opening into the motor chamber 22 in the main housing portion 20C.

As shown, the illustrative tool is equipped with a suitable chuck 32 for mounting the tool element D. The chuck is disposed within the forward end of the tool and is adapted for longitudinal movement within the nose piece 20A and the forward end of the housing portion 20B. It is accessible through the openings 21 in the nose piece to permit its operation to mount and demount the tool element D. The chuck is carried by a spindle 34 which is rotatably supported in suitable antifriction bearings 35 of the radial-thrust type. The bearings are mounted in longitudinally spaced relation within a spindle housing 36. The spindle housing is disposed within the forward end of the housing portion 20B and is mounted for longitudinal movement with respect thereto but is restrained against rotary movement.

Coaxially within the housing portions 20B and 20C is a drive shaft 38. The drive shaft is journaled adjacent its rear end in an antifriction bearing 39 and at its rear end mounts a suitable carrier 40 for the planetary gears 41 of a speed reduction gear train indicated generally at 42. The speed reduction gearing includes as a driving element a sun gear 44 which is rigid with the forward end of the output shaft of the motor M. The sun gear meshes with the planetary gears 41 to drive them within a stationary ring gear 45. The planetary gears 41 are mounted on stub shafts 46 which in turn are mounted upon the carrier 40 which is rigid with the drive shaft 38. The ring gear 45 of the speed reduction gear train 42 is held in place within the housing portion 20C by a bearing sleeve 48 which also serves to support the rear shaft bearing 39.

Interposed between the drive shaft 38 and the spindle 34 is a feed or lead screw 50. The lead screw is of hollow or tubular construction having a bore 51 therethrough. At its outer end the screw 50 is adapted to be non-rotatively connected with the rear end of the spindle 34. For this purpose the rear end of the spindle is provided with a radial flange 34a of somewhat enlarged diameter and a coaxial rearwardly-projecting boss 34b of reduced diameter. The forward end of the lead screw 50 is complementally formed and thus is provided with a radial flange 50a which is adapted to bear against the flange 34a of the spindle 34, and the boss 34b is received within the forward end of the screw's bore 51. And an internally threaded locking nut 52 is provided for engagement with the rear face of the screw flange 50a to hold that flange against the spindle flange 34a, the latter being complementally threaded for reception of the nut. Maintenance of a non-rotative driving connection between the lead screw and the spindle is insured by the provision of a key 53.

In order to provide a non-rotative driving connection between the drive shaft 38 and the lead screw 50, yet a connection which permits relative longitudinal movement therebetween, the drive shaft is provided with external splines 54 along the forward end thereof, and lead screw is provided, adjacent the rear end thereof, with similarly disposed and complementally formed internal splines 56.

From the foregoing it will be apparent that rotation of the motor M is imparted to the drive shaft 38 by way of the speed reduction gearing 42 and thence to the spindle 34 by way of the lead screw 50 so as to rotate the chuck 32 and the tool element D carried thereby.

In conjunction with the lead screw a positively driven lead screw driving sleeve 58 is utilized to effect longitudinal movement of the spindle 34, the chuck 32, and the tool element D mounted therein. As shown, the lead screw drive sleeve 58 is of tubular form and is concentrically supported for rotation about the drive shaft 38 by radial-thrust type antifriction bearings 59 which are mounted in spaced relation within the housing portion 20B. Adjacent its forward end the lead screw drive sleeve 58 is provided with an internal screw thread for driving engagement with a complementally formed external thread which extends the full length of the lead screw 50.

Interposed between the drive shaft and the lead screw drive sleeve is a power transmission which comprises a pair of planetary gear trains generally designated 60 and 62, respectively. These gear trains are arranged in what can appropriately be termed "back-to-back" relation. Thus the planetary gear elements of each train are mounted for rotation on a common gear cage or carrier 64. As shown, the gear cage 64 is journaled for rotation with respect to the drive shaft upon plurality of needle-type bearing elements 65.

In the illustrative transmission there is included a first or driving terminal gear 66 which is fixed to the drive shaft 38 and which meshes with planetary gear elements 67 disposed about the same. The planetary gear elements 67 are rotatably mounted on stub shafts 67a which in turn are received in suitable bores formed longitudinally in the gear cage 64 adjacent the rear end thereof. The planetary gear elements 67 are arranged to rotate within a ring gear 68. The ring gear is fixed within a sleeve bearing 69 which in turn is received within a sleeve 70 disposed concentrically within the forward end of the rear or main housing section 20C.

Adjacent the forward end of the gear cage or carrier 64 are mounted the planetary gear elements 71 of the forward gear train 62. These planetary gear elements are mounted on stub shafts 71a which are received in suitable bores formed longitudinally in the carrier. The planetary gear elements 71 rotate within a ring gear 72 which is non-rotatively held within the forward end of the sleeve 70. The planetary gear elements 71 of the forward gear train 62 mesh with a second terminal or driven gear element 74 which is fixed to the rear end of the lead screw drive sleeve 58 as by a key 58a and lock nut 58b.

With the ring gear 68 of the rear gear train 60 held stationary, it will be apparent that rotation of the first terminal or driving gear 66, so as to effect rotation of the planetary gears 67, results in rotation of the carrier 64. Upon rotation of the carrier, the planetary gears 71 of the forward gear train 62 are rotated within the fixed ring gear 72 because of their mounting upon the carrier 64. As a result the second or driven terminal gear 74 is rotated. When the driven terminal gear is rotated, because of its rigid connection with the lead screw drive sleeve 58, the latter is also rotated. The speed-change ratios of the gear trains 60 and 62 are so chosen that under the foregoing conditions of operation, with driving force transmitted from the drive shaft 38 by way of the transmission to drive the sleeve 58, the sleeve is rotated at a speed somewhat greater than the speed of rotation of the drive shaft and in the same direction. Since the lead or feed screw 50 is directly coupled to the drive shaft 38, the screw, then, is rotated at a speed somewhat less than the speed of rotation of the driving sleeve 58. Thus, with the thread of the drive sleeve 58 and the thread of the screw 50 properly chosen with respect to the direction of rotation of the drive shaft 38, the rotational speed differential between the sleeve and the shaft under this condition of operation results in forward or feeding movement of the screw with respect to the sleeve. As a result the spindle 34, its housing 36, the chuck 32, and the tool element D are positively fed forwardly.

To effect return movement of the spindle, its housing, the chuck, and the tool element, the transmission is constructed and arranged so that rotation of the lead screw sleeve is restrained so that it is less than the speed rotation of the feed screw 50 at which it is driven by the drive shaft 38. For this purpose in the illustrative tool the rear gear train 60 of the transmission is fashioned so that in return condition of operation the transmission of driving force therethrough to the carrier and thence by way of the gear train 62 to the sleeve 58 is interrupted. To this end the ring gear 68 of the rear gear train is adapted to be released for rotation with respect to the tool's housing. With the ring gear 68 free to rotate, driving force imparted from the drive shaft 38 to the planetary gear 67 by way of the terminal gear 66 effects rotation of the ring gear 68 and its supporting sleeve bearing 69. Under this condition of operation little, if any, of the driving force is imparted to the transmission gear cage or carrier 64. Thus, the gear train 62 is ineffective to drive the feed screw drive sleeve 58. It will be apparent then that the shaft 38 and feed screw 50 rotate at a speed substantially greater than that of the sleeve 58 with the result that the feed screw 50, spindle 34, spindle housing 36, chuck 32, and the tool element D are rapidly returned.

Means is provided for conditioning the transmission so as to effect feed and return movement of the tool. More particularly, means is provided for alternatively restraining rotation of the ring gear 68 of the rear gear train 60 and freeing the carrier 64 and for restraining the carrier and freeing the ring gear 68 so as to alternatively drive or idle the feed screw driving sleeve 58. Further, the invention contemplates the inclusion of such means which is pressure fluid actuated together with control means therefor for automatically effecting a complete operating cycle consisting of feed and return movements with the tool stopping at the end of the return stroke in feed condition ready for the initiation of a succeeding cycle of operation.

In carrying out this aspect of the present invention the illustrative device includes a pair of control pistons 76 and 78 which are respectively engageable with the ring gear sleeve bearing 69 and with the carrier 64 to brake the same. As shown, the piston 76 is axially slidable within a cylinder defined by the rear end of the sleeve 70. The forward annular face of the piston 76 is engageable with the ring gear sleeve bearing 69 so that when the piston is moved forwardly into engagement with the sleeve bearing, the sleeve bearing and the ring gear 68, which is rigid therewith, are restrained against rotation with respect to the tool's housing.

The piston 78 is mounted concentrically within the piston 76 for longitudinal movement with respect thereto, and is rearwardly biased within the piston 76 by a flat annular or "Belleville" type spring 79 which is interposed between a shoulder on the piston 78 and a snap ring carried by the piston 76. The forward annular face of the piston 78 is adapted to engage the rear face of the carrier or gear cage 64, in order to restrain rotary movement of the carrier as might result from frictional transmission of rotary movement when the mechanism is conditioned to effect return movement of the spindle 34. The piston 76 together with the sleeve 70 and the bearing housing 48 defines a chamber 80 to which pressure fluid is supplied to move the piston 76 forwardly into engagement with the ring gear sleeve bearing 69. The piston 78, which is disposed within the piston 76, and the contiguous inner surfaces of the piston 76 define a chamber 82 for the reception of pressure fluid whereby to advance the piston 78 into engagement with the carrier 64 and to move the piston 76 out of engagement with the ring gear sleeve bearing 69.

Pressure fluid supply to the chambers 80 and 82 is under the control of a reversing valve 84 to which pressure fluid is supplied from the control valve 26. The control valve 26 includes an external cartridge 85, an internal sleeve 86, and a spool or plunger 88. Intermediate its ends the cartridge 85 is provided with a port 85a which registers with the enlarged upper end of the supply passage 29 in the handle of the tool to define an inlet chamber for the valve. The sleeve 86 is provided with a port 86a intermediate its ends which registers with the port 85a when the sleeve is in its forwardmost position within the cartridge 85, the sleeve being biased toward such position by means of an expansion type spring 89. Diametrically opposite the port 86a, the sleeve 86 is provided with another port 86b. Diametrically opposite the port 85a the cartridge 85 is provided with a pair of longitudinally spaced ports 85b and 85c. The port 85c communicates with the motor supply passage 30, and the port 85b communicates with an annular chamber 91 defined by a relieved portion on the rear end of the bearing sleeve 48 and the adjacent inner surfaces of the housing portion 20c. Communication between the chamber 91 and the inlet chamber 84a of the reversing valve 84 is afforded by a port 92 formed in the top of the housing portion 20c.

Figures 1, 2:
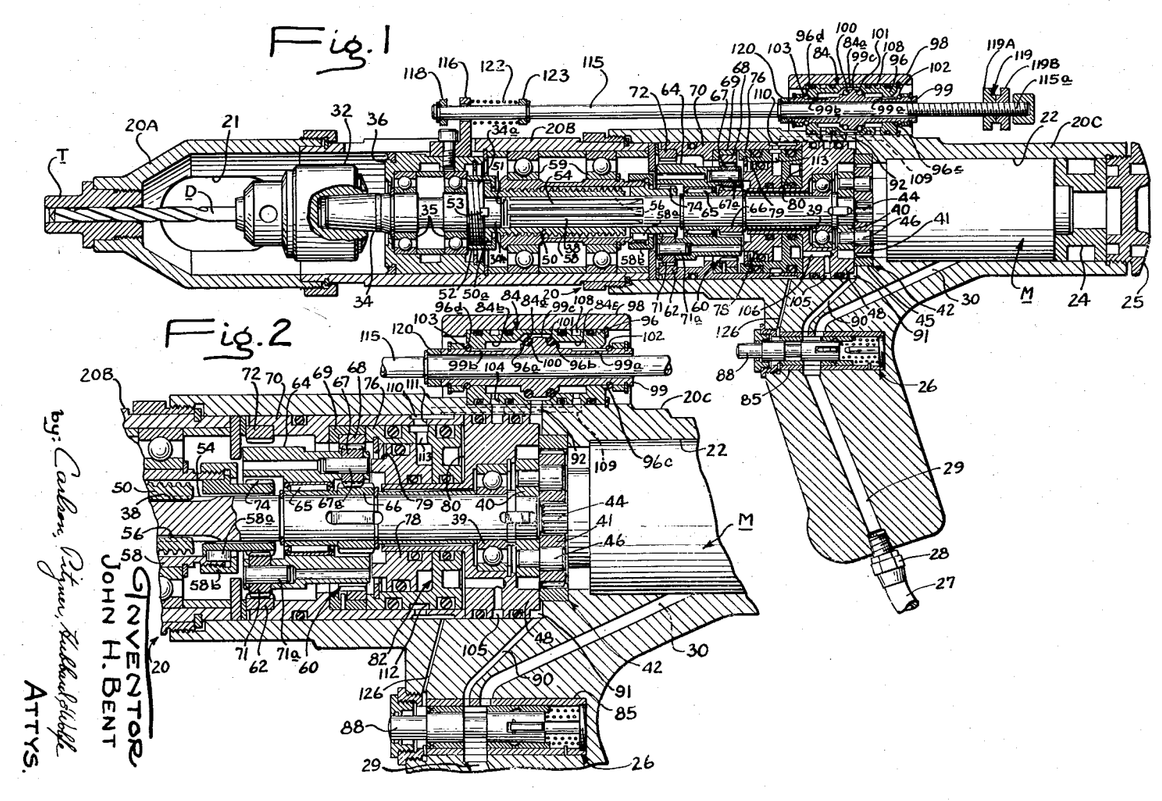
Figure 1 is a central longitudinal section through a portable pressure fluid operated tool embodying the features of the present invention and showing the parts thereof in rest position.
Fig. 2 is a fragmentary central longitudinal section, on a somewhat enlarged scale, of the mid portion of the tool shown in Fig. 1 but showing component relationship for forward or feed condition of operation.
Figure 6:
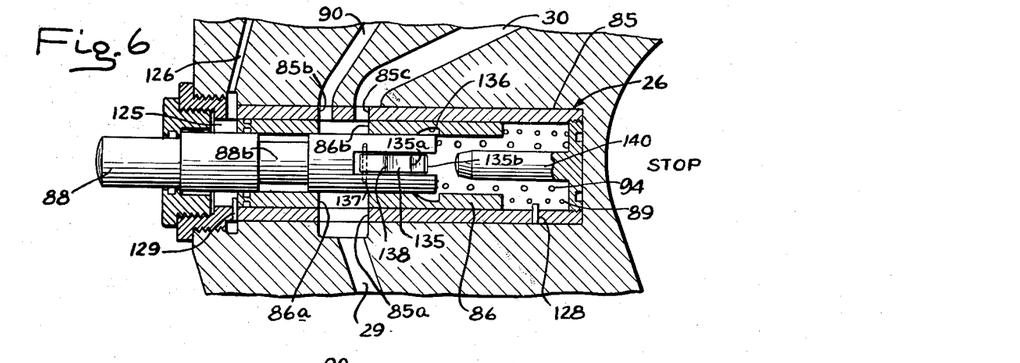
Figs. 6, 7 and 8 are fragmentary sectional views taken longitudinally through the control valve of the tool shown in the preceding figures and respectively showing the component parts thereof in rest, forward or feed, and return conditions of operation.
Figure 7:
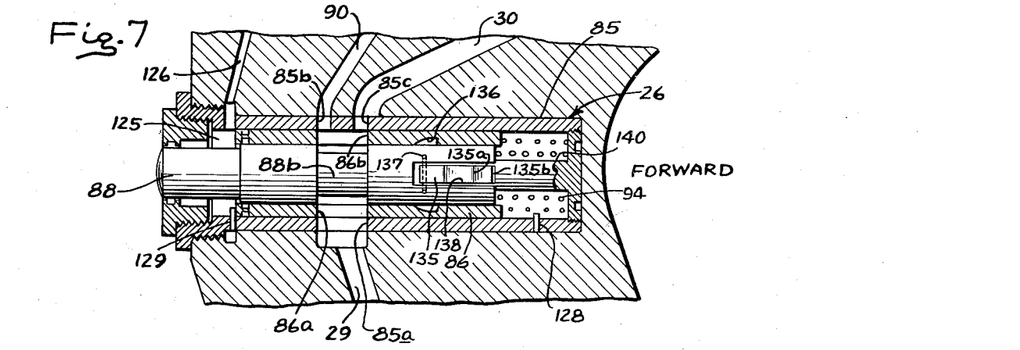
Figures 8, 9:
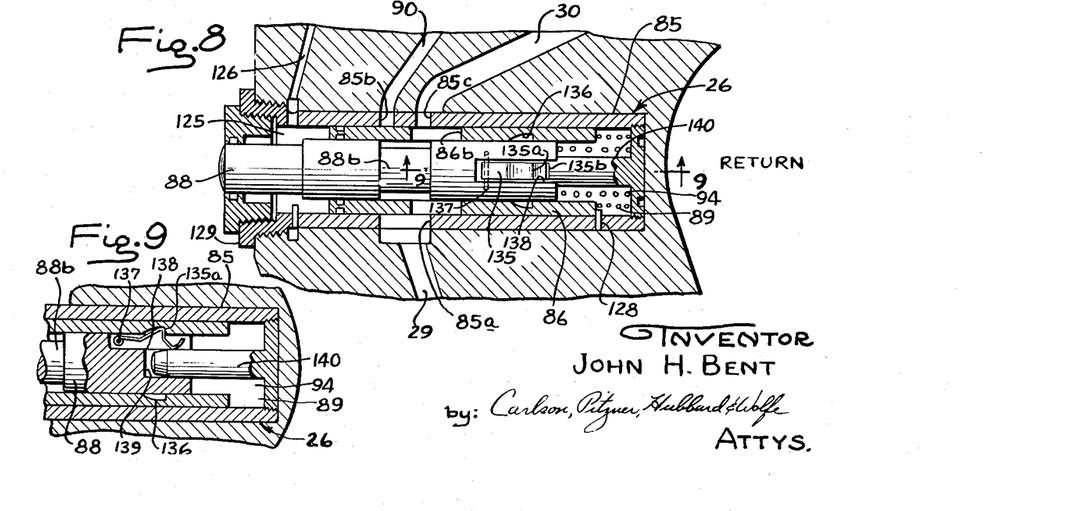
Fig. 9 is a fragmentary transverse section taken substantially in the plane of line 9—9 in Fig. 8.

The spool or plunger 88 of the valve 26 is equipped at its forward end with an outwardly projecting finger piece for engagement by the finger of an operator using the tool. The spool 88 is normally biased outwardly by means of an expansion type spring 94 interposed between the rear end of the plunger and the bottom of the cartridge 85. Intermediate its ends the spool 88 is relieved to define an annular passage 88b which is adapted to register with the ports 86a and 86b of the sleeve 86, within which the spool 88 is longitudinally movable, when the spool 88 is moved inwardly therein. In Figs. 1 and 6 of the drawings the valve 26 is shown in position for "stop" or "rest" condition of the tool, in which position the spool 88 is fully extended under the action of the spring 94. In Figs. 2 and 7 of the drawings the spool is shown in depressed position with the spring 94 compressed and the annular passage 88b registering with the sleeve ports 86a and 86b. It will be apparent that in this position of the plunger with respect to the sleeve, and with the sleeve in its forward position, pressure fluid is supplied from the supply passage 29 and port 85a through the port 86a, the passage 88b, the port 86b to the ports 85b and 85c. From the port 85c pressure fluid is supplied by way of the motor supply passage 30 to actuate the motor M. At the same time pressure fluid is supplied from the port 85b to the chamber 91 by way of the passage 90, and from the chamber 91 to the inlet chamber 84a of the valve 84 by way of the port 92.

In addition to the inlet chamber 84a the reversing valve 84 includes pair of distribution chambers 84b and 84c. The forward distribution chamber 84b serves to receive pressure fluid from the inlet chamber for delivery to the piston chamber 80 behind the piston 76 during forward or feed condition of operation. Additionally the chamber 84b serves to receive fluid from the chamber 80 for dispatch to the atmosphere during return condition of operation. Similarly the rear distribution chamber 84c serves to receive pressure fluid from the inlet chamber 84a for delivery to the piston chamber 82, which is located between the pistons 76 and 78, upon the establishment of reverse condition of operation. The chamber 84c also receives fluid exhausted from the chamber 82 for dispatch to the atmosphere when the tool is in feed condition. Upon reference to the drawings it will be seen that the valve 84 includes a sleeve 96 which is received in a hollow boss 98 formed longitudinally upon the rear or main housing portion 20c. The valve 84 also includes a longitudinally shiftable valving element 99 which is mounted for limited longitudinal movement within the sleeve 96. The valving element 99 has a central portion 99c of enlarged diameter which is suitably relieved for the reception of O-rings 100 and 101. The O-rings 100 and 101 are adapted to seat against tapered internal shoulders 96a and 96b, respectively, according to the relative position of the valving element 99 within the sleeve 96. Spaced inwardly from its ends the valving element 99 is equipped with O-rings 102 and 103. The O-ring 102 is adapted to seat against a rearwardly facing, tapered annular surface 96c when the valve element 99 is in its forward position. The O-ring 103 is adapted to seat against a forwardly facing tapered annular surface 96d when the valve element 99 is in its rearmost position. Communication is provided between the rear distribution chamber 84c and the atmosphere by way of a groove 99a formed longitudinally in the valving element 99 which groove terminates at its outer end adjacent the O-ring 102. Similarly, communication between the distribution chamber 84b and the atmosphere is provided by a groove 99b formed in the valving element 99 which groove terminates adjacent the O-ring 103.

Communication between the distribution chamber 84b and the piston chamber 80 is afforded by way of a passage 104 which passage is formed by appropriately porting the sleeve 96 and the housing portion 20c. At its inner end the passage 104 communicates with an annular groove 105 peripherally formed in the bearing sleeve 48. From the groove 105 pressure fluid is supplied to the chamber 80 by way of an L-shaped passage 106.

Communication between the distribution chamber 84c and the piston chamber 82 is provided by way of a port 108, formed adjacent the rear end of the sleeve 96, which port communicates with a longitudinal passage 109 formed in the housing portion 20c. At its forward end the passage 109 opens into an annular chamber 110 which is formed by suitably relieving the sleeve 70 adjacent the rear end thereof. From the chamber 110 fluid is supplied by way of a port 111 to an annular groove 112 peripherally formed in the piston 76. Communication between the piston groove 112 and chamber 82 is provided by a port 113.

It will be apparent from the foregoing that with the valving element 99 in its rearmost position the O-ring 101 seats against the surface 96b interrupting communication between the valve chambers 84a and 84c, and the O-ring 100 is moved from engagement with the surface 96a so as to establish communication between the inlet chamber 84a and the forward distribution chamber 84b. Thus, with the control valve 26 operated into the position shown in Figs. 2 and 7, live pressure fluid is supplied to the piston chamber 80 by way of the distribution chamber 84b, the passages 104, 105 and 106. At the same time communication between the chamber 82 and the atmosphere, to permit exhausting of the chamber 82, is established by way of the port 113, the groove 112, the port 111, the chamber 110, the passage 109, the port 108, the rear distribution chamber 84c, the groove 99a, and out between the surface 96c and the O-ring 102, the O-ring 102 which is carried by the valving element 99 being unseated from the surface 96c when the valving element 99 is in its rearmost position.

When the valving element 99 is in its forwardmost position the O-ring 102 seats against the surface 96c to close off communication between the distribution chamber 84c and the atmosphere. Also when the valving element is in its forward position, the O-ring 101 is moved from engagement with the surface 96b; the O-ring 100 is seated against the surface 96a; and the O-ring 103 is moved from engagement with the surface 96d. Thus, communication between the inlet chamber 84a and the rear distribution chamber 84c is established for the supply of pressure fluid to the piston chamber 82 by way of the port 108, the passage 109, the chamber 110, the port 111, the groove 112 and the port 113.

When the pressure fluid is supplied to the chamber 82 the piston 76 is urged rearwardly out of engagement with the ring gear bearing sleeve 69 thereby freeing the ring gear for rotation. Simultaneously the piston 78 is urged forwardly into engagement with the gear cage or carrier 64 so as to restrain its rotation. Thus, return condition of operation is established for the shaft 38 and lead screw 50 are rotated faster than the restrained drive sleeve 58.

In return condition of operation the piston chamber 80 is exhausted to the atmosphere by way of the passage 106, the annular passage 105, the passage 104, the forward distribution chamber 84b, the groove 99b, and out by way of the space that is now open between the O-ring 103 and the surface 96d. The exhausting of the chambers 80 and 82 is provided so that appropriate piston movement is unimpeded by fluid that might be trapped in the chambers.

As hereinbefore noted the present invention contemplates that the control means incorporated in the device will automatically effect a complete operating cycle consisting first of a feed stroke and then of a return stroke with the tool stopping at the end of the return stroke in feed condition ready for the initiation of a succeeding cycle of operation. In the illustrative tool the valving element 99 is adapted to be operated by a control rod 115. The control rod 115 is disposed in generally parallel relation to the housing 20 of the tool along the side thereof opposite the tool's handle. The control rod is freely slidable within the valving element 99 and adjacent its forward end it extends through an operating finger 116 which is fixed to and movable with the spindle bearing housing 36. Forwardly of the finger 116 and engageable thereby the control rod mounts a stop nut 118. The rear end of the control rod 115 is threaded as at 115a for the reception of stop means, generally designated 119, which consists of a stop nut 119A and a lock nut 119B. The stop nut 119A is engageable with the rear face of the valving element 99 of the valve 84 to move the same forwardly. The stop means 119 can be positioned as desired along the control rod 115 to determine the forward stroke limit. Intermediate its ends the control rod 115 is equipped with a fixed stop 120 engageable with the forward end of the valving element 99 near the end of the return stroke of the tool so as to move the valving element 99 rearwardly and reposition the same for the initiation of a succeeding forward stroke.

Figures 3, 4:
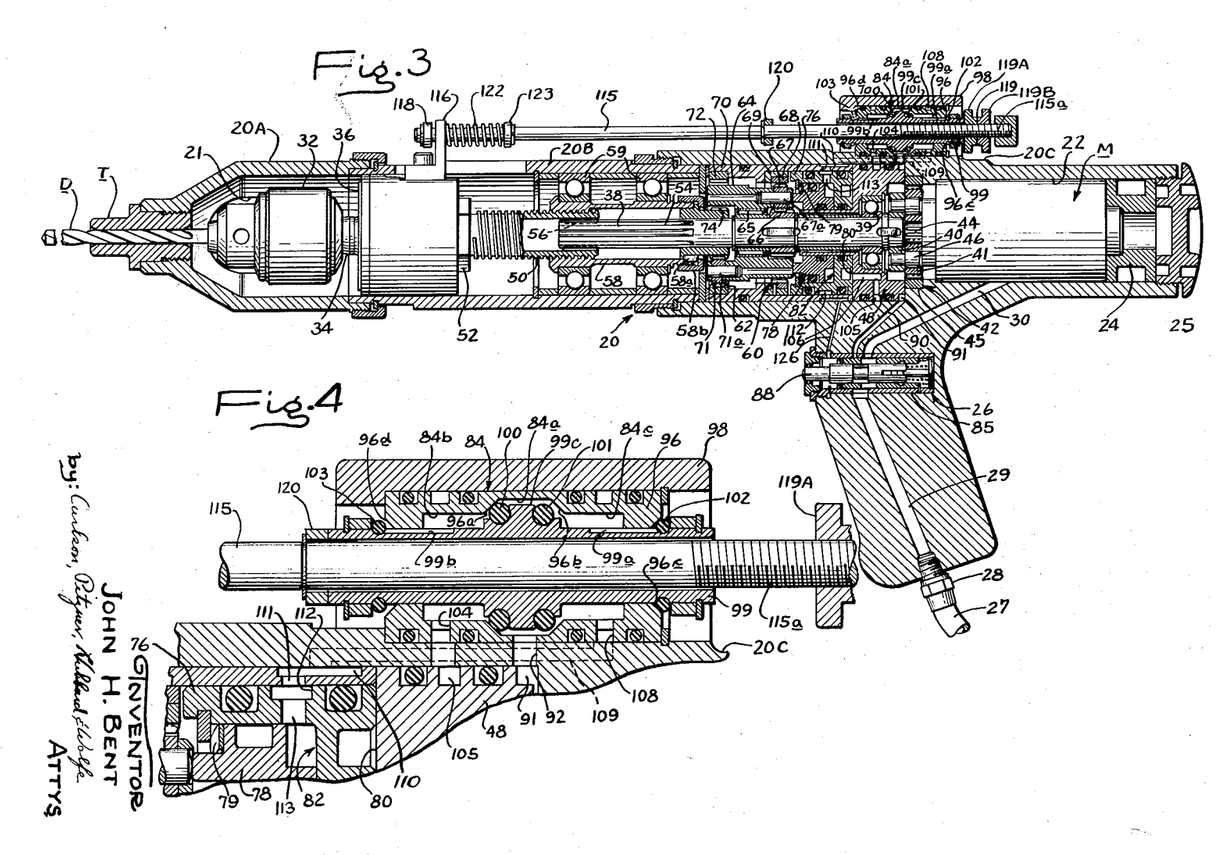
Fig. 3 is a view similar to Fig. 1 but showing relative component positions at the beginning of the return stroke of the spindle.
Fig. 4 is a fragmentary view similar to Fig. 2 but showing relative component positions during the return stroke of the spindle.
Figures 5, 10:
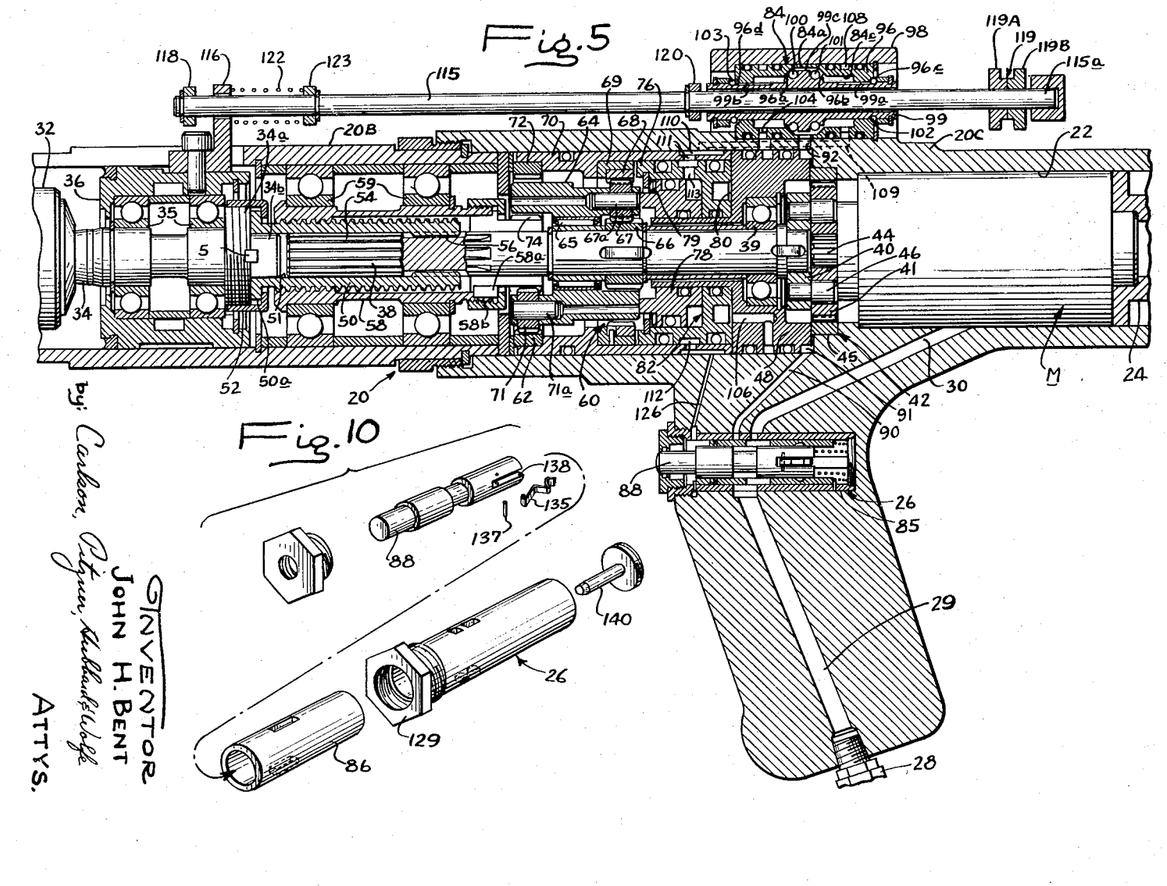
Fig. 5 is a fragmentary view similar to Figs. 1 and 3 but illustrating component relationship as the return stroke is about to be completed and the tool restored to rest condition.
Fig. 10 is an exploded perspective view of the control valve of the illustrative device.

Assuming that the valving element 99 of the reversing valve 84 is in its rearmost position (Figs. 1 and 2), when the fingerpiece 88a of the control valve 26 is depressed (Fig. 2), forward feeding movement is initiated, since, as hereinbefore explained, live pressure fluid is supplied from the control valve 26 both to the motor M by way of the passage to actuate the same and also by way of the passages 90, 91 and 92 to the valve inlet chamber 84a, and from the chamber 84a live pressure fluid is supplied by way of the forward distribution chamber 84b, the passages 104, 105 and 106 to the piston chamber 80. This causes the piston 76 to be moved forwardly fixing the ring gear 68 and its sleeve bearing 69 with respect to the tool's housing. In this position of the reversing valve element 99 the piston chamber 82 is exhausted to atmosphere by way of the port 113, annular chamber 112, port 111, groove 110, passages 109, port 108, rear distribution chamber 84c, groove 99a, and out by way of the space between the surface 96c and the O-ring 102. As forward or feeding movement of the lead screw 51, spindle 34, chuck 32 and tool D continues, the spindle bearing housing 36 and the finger 116 also move forwardly with the finger 116 in engagement with the forward stop 118 which is rigid with the control rod 115. Thus, the control rod 115 also is moved forwardly with respect to the valving element 99. This forward movement continues until engagement of the stop 119 with the rear end of the valving element 99. Upon such engagement the valving element is moved forwardly into the position shown in Fig. 3. When the valving element 99 is moved into its forwardmost position, communication between the inlet chamber 84a and the rear distribution chamber 84c is established, and communication between the rear distribution chamber 84c and the atmosphere is interrupted by the engagement of the O-ring 102 with the surface 96c of the sleeve 96 of the valve 84. As a result live pressure fluid is supplied from the inlet chamber 84a to the rear distribution chamber 84c and thence by way of port 108, passage 109, chamber 110, port 111, groove 112 and port 113 to the piston chamber 82. The introduction of live pressure fluid to the chamber 82, as hereinbefore set forth serves the functions of urging the piston 78 forwardly into engagement with the transmission gear cage 64 so as to restrain rotation thereof and of urging the piston 76 rearwardly out of engagement with the sleeve bearing 69 thereby freeing the same and the ring gear 68 for rotation within the sleeve 70 and thus with respect to the housing 20. Rearward movement of the piston 76 is unimpeded by any fluid trapped in the chamber 80 because with the forward shifting of the valving element 99 communication with the atmosphere of the chamber 80 is established by way of the passage 106, the annular groove 105, the port 104, the forward distribution chamber 84b, the groove 99b and out between the O-ring 103 and its seat 96d on the sleeve 96 of the control valve 84.

As return movement of the spindle 34 and associated components proceeds the trip finger 116 moves rearwardly along the control rod 115 and into engagement with the forward end of a spring 122 and urges the spring against a collar 123. The spring 122 is mounted on the control rod 115 and the collar 123 is fixed to the control rod, thus rearward movement is imparted to the control rod 115. As this movement continues the stop 120, which is also fixed to the control rod 115, approaches the forward end of the valving element 99 of the reversing valve 84. When engagement between the stop 120 and the valving element 99 obtains, the valving element is shifted into its rearmost position thereby repositioning the valving element for the initiation of the next cycle of operation beginning with a forward or feed stroke. Since the illustrative tool is a relatively high speed device the rapidly rotating components thereof acquire considerable momentum. Thus, even though the valving element 99 is repositioned, return movement of the spindle and associated components continues for a short time until the difference in speeds of the drive sleeve 58 and the screw 38 becomes zero. With respect to the valving element 99 therefore this continued rearward movement may be termed an override. It is to absorb this override that the spring 122 is provided, the spring together with the collar 123, rod 115 and stop 120 insuring operation of the reversing valve 84, with the spring absorbing any additional relative rearward movement of the trip finger with respect to the control rod without danger of jamming the feed screw, drive sleeve or the trip finger and the housing at the end of the return stroke of the device.

As hereinbefore pointed out it is desirable that the tool stop at the end of its return stroke and not automatically recycle. For this purpose means is provided for interrupting the supply of pressure fluid to the reversing valve 84 upon completion of the return stroke of the tool until positive action by the operator of the tool is effected. In the present instance the control valve 26 is especially constructed to perform this function, and its contemplated operation is such that it closes the port 85b after the valve 84 is operated into forward or feed position, and maintains it closed until the operator releases the fingerpiece 88a. When he does this the valve automatically resets so that when the operator again depresses the fingerpiece 88a a new cycle is initiated with forward or feeding movement of the device.

It will be seen that when the valving element 99 is moved into its forwardmost position so that live pressure fluid is supplied to the rear distribution chamber 84c from the inlet chamber 84a of the reversing valve, this live pressure fluid is conducted by way of the port 108, the passage 109, to the annular chambers 110 and 112 which are formed by peripheral grooves in the sleeve 70 and piston 76, respectively. Restricted communication is provided between the annular chamber 110 and a chamber 125 within the control valve 26 by way of a bleeder passage 126 formed in the rear housing portion 20c. The chamber 125 is defined by the inner wall of the cartridge 85, the plug 85A which closes the forward end thereof, and the outer surface of the forward portion of the valve spool 88. The rear end of the chamber 125 is formed by the forward face of the control valve sleeve 86. Thus when live pressure fluid is admitted to the annular chamber 110 and thence to the piston chamber 82 by way of the ports 111 and 113 and chamber 112 some of this live pressure fluid is bled off to the chamber 125, by way of the passage 126, to exert a rearward force on the control valve sleeve 86. Since this is so-called bleeder action, there is manifested a delay in the build-up of fluid pressure in the chamber 125 as compared to the build-up of fluid pressure in the chamber 82. Fluid pressure in the chamber 82 serves to effect release of the ring gear 68 and its sleeve bearing 69 and to effect braking of the gear cage 64 to the end that return movement of the spindle and its associated components is initiated and such movement is well under way by the time that the pressure in the chamber 125 is built up. When the pressure in the chamber 125 builds up sufficiently to overcome the opposing force exerted on the valve sleeve 86 by the biasing spring 89, the sleeve 86 is moved rearwardly until the sleeve engages the rear limit stop 128. In this position it will be seen that the port 86b has been moved rearwardly with respect to the port 85b and the contiguous portion of the sleeve 86 interrupts the supply of live pressure fluid to the port 86b and to passage 90 and thence by way of the annular chamber 91 and port 92 to the inlet chamber 84a of the reversing valve 84. However, the stop 128 is so positioned as to limit rearward movement of the sleeve 86 so that the supply of live pressure fluid to the motor supply passage 30 and thence to the motor M by way of the port 85c is not interrupted and operation of the motor M continues as does the return movement of the spindle. Since the valving element 99 remains in its forward position until such time as the stop 120 engages the forward end of it to shift it rearwardly, pressure fluid is trapped in the chamber 84a, the rear distribution chamber 84c, the passage 109, the annular chambers 110 and 112, and the piston chamber 82 and valving chamber 125.

While there may be some leakage of pressure fluid from the chamber 82 and therefore a reduction of fluid pressure in this chamber, it will be apparent that this will not impair operation of the device, nor will the return stroke be interrupted, because until live pressure fluid is again supplied to the piston chamber 80 the piston 76 remains in its rearmost position, thus leaving the ring gear sleeve bearing 69 and the ring gear 68 free to rotate within the sleeve 70. So long as this condition obtains the only rotative force imparted to the gear carrier 64 is that which might occur as a result of friction, and this is insufficient to negate the rotational speed differential between the lead screw and the lead screw driving sleeve.

With the sleeve 86 of the control valve 26 in its rearmost position the port 86b no longer registers with the port 85b, as hereinbefore noted, and thus supply of live pressure fluid to the passage 90 and thence to the distribution chamber 84a of the valve 84 is interrupted. Therefore, even when the stop 120 on the control rod 115 engages the forward face of the valving element 99 and shifts it rearwardly, no live pressure fluid is supplied to the piston chamber 80 so long as the valve sleeve 86 is in its rearmost position.

Means is provided to retain the valve sleeve 86a in its rearmost position once it has been shifted into such position by the action of the pressure fluid in the chamber 125. As shown this means consists of a latch spring 135 which is carried by the spool 88 and is engageable in a notch 136 formed in the sleeve 86. The latch spring 135 is formed of leaf spring material and is fashioned to present a rearwardly facing shoulder 135a which is adapted to be engaged in the notch 136, the latter being complementally formed. The spring 135 is pivoted at its forward end on a pin 137 which extends across the forward end of a longitudinal groove 138 formed adjacent the rear end of the valve spool 88. The groove 138 intersects a bore 139 formed in the rear end of the spool 88. The bore 139 is adapted to receive the forward end of a cam stud 140 which projects forwardly from the rear end of the cartridge 85 of the valve 26. To cooperate with the cam stud the rear end portion of the spring 135, as at 135b, is made of generally U-shape, and is adapted to extend into the bore 139.

It will be seen that when the operator depresses the valve spool 88 and when the valve sleeve 86 is in its forwardmost position the spring 135 moves with the spool 88 and the shoulder 135a thereon traverses the notch 136. As this movement continues the cam follower portion 135b of the spring engages the forward end of the cam stud 140, upon entry thereof into the bore 139. Thus the latching spring 135 is biased into condition for snapping into the notch 136 in the sleeve 86. When pressure fluid builds up in the valve chamber 125 sufficiently to overcome the force of the sleeve biasing spring 89, and thus the sleeve 86 is urged rearwardly, the notch 136 is moved into a position where it registers with the shoulder 135a of the spring 135. Since by the rearward movement of the valve spool 88 with respect to the cam stud 140 the spring 135 was biased, then when registery occurs the spring shoulder 135a snaps into the recess 136 and the sleeve 86 is held in its rearmost position.

When the valving element 99 of the reversing valve 84 is shifted into its rearmost position by engagement therewith of the stop 120 on the control rod 115 and the piston chamber 82 is exhausted to the atmosphere, pressure fluid in the valve chamber 125 can also bleed off to atmosphere. But the sleeve 86 of the control valve 26 remains in its rearmost position, and the supply of live pressure fluid to the passage 90 is prevented so long as the operator holds the valve spool 88 depressed. Thus, even though the valving element 99 has been shifted into its rearmost position and thereby reconditioning the tool for forward or feeding movement, such movement cannot occur until the operator has released the spool 88.

When the operator releases the spool 88, the spool biasing spring 94 urges the spool forwardly and the cam stud 140 is withdrawn from the spool bore 139. When this occurs the rear end portion 135b of the spring 135 can drop into the bore 139 and the shoulder 135a is disengaged from the notch 136 in the spool 86. As a result, and because with the shifting of the valving element 99 into its rearmost position to establish an exhaust path from the piston chamber 82 and pressure fluid is also exhausted from the valve chamber 125, the spring 89 can effect forward movement of the valve sleeve 86 until its forward end engages the forward limit stop 129. Thus the control valve elements are restored to their normal or rest condition, with the port 86b in registry with the port 85b, so that when the operator again depresses the control valve spool 88, the next cycle of operation is begun with forward or feeding movement. This occurs because, it will be recalled, the valving element 99 of the reversing valve 84 was shifted upon the completion of the return stroke into its rearmost position so that live pressure fluid is directed from the passage 90 into the piston chamber 80 to urge the piston 76 forwardly to brake the ring gear 68, and with the piston chamber 82 exhausted to atmosphere the spring 79 is effective to urge the piston 78 rearwardly out of engagement with the carrier 64 to free it for rotation by the planetary elements of the rear gear train of the transmission.

I claim as my invention:

1. A pressure fluid actuated tool comprising, in combination, a spindle for mounting a cutting element, means for supporting the spindle for longitudinal and rotational movement, a drive shaft, a pressure fluid actuated motor for rotating said shaft, a feed screw non-rotatably coupled to said drive shaft and to said spindle for drivingly connecting the same, a feed screw sleeve and drive means therefor interposed between said drive shaft and said feed screw for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears and including a unitary carrier rotatably mounting the planetary gears of both of said gear trains, and means for alternatively restraining rotation of the ring gear of one of said gear trains and of said carrier so as to effect rotation of said sleeve at rates faster and slower, respectively, than the rate of rotation of said feed screw to feed and return said spindle.

2. A pressure fluid actuated tool comprising in combination a spindle for mounting a cutting element, means for supporting the spindle for longitudinal and rotational movement, a drive shaft, a pressure fluid actuated motor for rotating said shaft, a feed screw non-rotatably coupled to said drive shaft and to said spindle for drivingly connecting the same, a feed screw sleeve and drive means therefor interposed between said drive shaft and said feed screw for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears and including a unitary carrier rotatably mounting the planetary gears of both of said gear trains, and control means for alternatively effecting rotation of said sleeve at rates faster and slower, respectively, than the rate of rotation of said feed screw to feed and return said spindle, said control means including a first piston for restraining rotation of the ring gear of one of said gear trains, a second piston for restraining rotation of said carrier, and including a valve for alternately supplying pressure fluid to said pistons.

3. In a pressure fluid actuated tool having a motor, the combination comprising a spindle for mounting a cutting element, means for supporting the spindle for longitudinal and rotational movement, a drive shaft driven by the motor, a feed screw non-rotatably coupled to said drive shaft and to said spindle for drivingly connecting the same, a feed screw sleeve and drive means therefor interposed between said drive shaft and said feed screw for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears and including a unitary carrier rotatably mounting the planetary gears of both of said gear trains, pressure fluid actuated means including a pair of pistons for alternatively restraining rotation of the ring gear of one of said gear trains and of said carrier so as to effect rotation of said sleeve at rates faster and slower, respectively, than the rate of rotation of said feed screw to feed and return said spindle, a reversing valve for alternatively applying pressure fluid to said pistons, and a valve controlling the supply of pressure fluid both to the motor and to said reversing valve.

4. A pressure fluid actuated tool comprising in combination a spindle for mounting a cutting element, means for supporting the spindle for longitudinal and rotational movement, a drive shaft, a pressure fluid actuated motor for rotating said shaft, a feed screw non-rotatably coupled to said drive shaft and to said spindle for drivingly connecting the same, a feed screw sleeve and drive means therefor interposed between said drive shaft and said feed screw for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears and including a unitary carrier rotatably mounting the planetary gears of both of said gear trains, pressure fluid actuated means including a pair of pistons for alternatively restraining rotation of the ring gear of one of said gear trains and of said carrier so as to effect rotation of said sleeve at rates faster and slower, respectively, than the rate of rotation of said feed screw to feed and return said spindle, a reversing valve having feed and return positions for alternatively applying pressure fluid to said pistons, means effective upon the attainment by said spindle of the limits of its forward and return strokes for automatically shifting said reversing valve from one to the other of its positions, and a valve controlling the supply of pressure fluid both to said motor and to said reversing valve, said control valving including a valving element for interrupting the supply of pressure fluid to said reversing valve at the end of the return stroke of said spindle whereby to effect single cycle operation of the tool.

5. A pressure fluid actuated tool comprising in combination a spindle for mounting a cutting element, means for supporting the spindle for longitudinal and rotational movement, a drive shaft, a pressure fluid actuated motor for rotating said shaft, a feed screw non-rotatably coupled to said drive shaft and to said spindle for drivingly connecting the same, a feed screw sleeve and drive means therefor interposed between said drive shaft and said feed screw for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears, and including a unitary carrier concentrically disposed with respect to said shaft rotatably mounting the planetary gears of both of said gear trains, pressure fluid actuated means including a pair of pistons concentrically disposed with respect to said shaft and telescoped one within the other and respectively operable for alternatively restraining rotation of the ring gear of one of said gear trains and of said carrier so as to effect rotation of said sleeve at rates faster and slower, respectively, than the rate of rotation of said feed screw to feed and return said spindle, a reversing valve having feed and return positions for alternatively applying pressure fluid to said pistons.

6. In a pressure fluid actuated tool having a motor, the combination comprising a spindle for mounting a cutting element, means for supporting the spindle for longitudinal and rotational movement, a shaft driven by the motor, a feed screw non-rotatably coupled to said drive shaft and to said spindle for drivingly connecting the same, a feed screw sleeve, drive means therefor interposed between said drive shaft and said feed screw sleeve for positively effecting longitudinal movement of said screw and spindle with respect to said drive shaft, said drive means including a first terminal gear fixed to said drive shaft, a second terminal gear fixed to said sleeve, and two planetary gear trains interposed between said terminal gears, and including a unitary carrier rotatably mounting the planetary gears of both of said gear trains, pressure fluid actuated means including a pair of pistons for alternatively restraining rotation of the ring gear of one of said gear trains and of said carrier so as to effect rotation of said sleeve at rates faster and slower, respectively, than the rate of rotation of said feed screw to feed and return said spindle, a reversing valve having feed and return positions for alternatively applying pressure fluid to said pistons, means effective upon the attainment by said spindle of the limits of its forward and return strokes for automatically shifting said reversing valve from one to the other of its positions, and a valve having a first valving element controlling the supply of pressure fluid both to said motor and to said reversing valve and having a second valving element for interrupting the supply of pressure fluid to said reversing valve near the end of the return stroke of said spindle, said valve also including means for maintaining said second valving element in its fluid supply interrupting position until said first valving element is operated to interrupt supply of pressure fluid to the tool.

7. In a pressure fluid actuated tool having a spindle for mounting a cutting element, a drive shaft connected to the spindle for rotating the same, and having screw means interposed between said drive shaft and said spindle for positively effecting longitudinal movement of said spindle with respect to said drive shaft, the combination comprising change speed gearing including two planetary gear trains having a unitary carrier rotatably mounting the planetary gears of both of said gear trains, said gearing being driven from the drive shaft and coupled to the screw means for driving the same, pressure fluid actuated means including a pair of pistons for alternatively restraining rotation of the ring gear of one of said gear trains and of said carrier so as to effect rotation of the screw means for alternatively feeding and returning the spindle, a reversing valve having feed and return positions for alternatively applying pressure fluid to said pistons, a control rod engageable with said reversing valve to operate the same between its positions, means movable with the spindle and effective upon the attainment by said spindle of the limits of its forward and return strokes for moving said control rod so as to operate said reversing valve, a control valve including a first valving element for applying pressure fluid both to the motor and to said reversing valve, and including a normally open second valving element for interrupting the supply of pressure fluid to said reversing valve near the end of the return stroke of said spindle, means for supplying pressure fluid to shift said second valving element toward closed position when said reversing valve is in its return position, and means for maintaining said second valving element in closed position so long as said first valving element remains in open condition, said second valving element being restored to open position upon closure of said first valving element whereby said tool is conditioned for a succeeding cycle of operation beginning with a feed stroke.

8. In a pressure fluid actuated tool having a spindle for mounting a cutting element, a drive shaft connected to the spindle for rotating the same, the combination comprising screw means including a feed screw and sleeve interposed between the drive shaft and the spindle for positively effecting longitudinal movement of the spindle, change speed gearing for effecting different relative rotational speeds of said screw and sleeve, said gearing being driven from the drive shaft and coupled to the screw means for driving the same, and pressure fluid actuated means for effecting operation of said gearing so as to attain feed and return movement of the spindle.

9. In a pressure fluid actuated tool having a spindle, a pressure fluid motor, a drive shaft connected to the motor for rotation thereby and to the spindle for rotating the same, and having differential feed screw means interposed between the drive shaft and the spindle for positively effecting longitudinal movement of said spindle and including change speed gearing driven from the drive shaft and coupled to the screw means for driving the same, the combination comprising pressure fluid actuated means operable upon said gearing for imparting different output speeds therefrom to said screw means and including a pair of pistons, a reversing valve having feed and return positions for alternatively applying pressure fluid to said pistons, means operatively connected with the spindle and effective upon the approach of the spindle to the limits of its forward and return strokes for moving said reversing valve from one of its positions into the other position thereof, a control valve including a first valving element for applying pressure fluid both to the motor and to said reversing valve, and including a normally open second valving element for interrupting the supply of pressure fluid to said reversing valve near the end of the return stroke of said spindle, means for supplying pressure fluid to shift said second valving element toward closed position when said reversing valve is in its return position, and means for maintaining said second valving element in closed position so long as said first valving element remains in open condition, said second valving element being restored to open position upon closure of said first valving element whereby said tool is conditioned for a succeeding cycle of operation beginning with a feed stroke.

References Cited in the file of this patent

UNITED STATES PATENTS 2,674,098    Taylor  ---------------- Apr. 6, 1954